United States Patent
Nicholls et al.

(10) Patent No.: US 12,240,983 B2
(45) Date of Patent: Mar. 4, 2025

(54) METHOD OF FORMING PROTECTIVE COATING

(71) Applicant: ROLLS-ROYCE plc, London (GB)

(72) Inventors: John R. Nicholls, Crainfield (GB);
Victoria Louise Minns, Cranfield (GB);
David S. Rickerby, Derby (GB)

(73) Assignee: Rolls-Royce PLC, London (GB)

( * ) Notice: Subject to any disclaimer, the term of this patent is extended or adjusted under 35 U.S.C. 154(b) by 120 days.

(21) Appl. No.: 18/062,041

(22) Filed: Dec. 6, 2022

(65) Prior Publication Data
US 2023/0203316 A1 Jun. 29, 2023

(30) Foreign Application Priority Data
Dec. 23, 2021 (GB) ...................... 2118927

(51) Int. Cl.
C23C 2/12 (2006.01)
C09D 1/00 (2006.01)
C23C 22/20 (2006.01)
C23C 22/78 (2006.01)

(52) U.S. Cl.
CPC ............... C09D 1/00 (2013.01); C23C 22/20 (2013.01); C23C 22/78 (2013.01)

(58) Field of Classification Search
CPC .................................................. C23C 22/20
See application file for complete search history.

(56) References Cited

U.S. PATENT DOCUMENTS

| | | | |
|---|---|---|---|
| 3,248,251 A * | 4/1966 | Allen | C23C 22/74 |
| | | | 277/936 |
| 4,005,989 A | 2/1977 | Preston | |
| 5,015,493 A * | 5/1991 | Gruen | C23C 14/32 |
| | | | 427/571 |
| 5,741,604 A | 4/1998 | Deakin et al. | |
| 6,428,630 B1 | 8/2002 | Mor et al. | |
| 2021/0172069 A1 | 6/2021 | Brady et al. | |

FOREIGN PATENT DOCUMENTS

WO 2018213441 A1 11/2018

OTHER PUBLICATIONS

Of Mahmoudi et al. "Characterization, growth kinetics and formation mechanism for aluminide coating by plasma paste aluminizing on IN738" (2021).*
Great Britain search report dated Jun. 9, 2022, issued in Great Britain Patent Application No. 2118927.9.
European search report dated Apr. 20, 2023, issued in EP Patent Application No. 22208968.2.

* cited by examiner

Primary Examiner — Austin Murata

(57) ABSTRACT

A method of forming a protective coating. The method includes providing a substrate including at least one chemical element and a surface; forming a basecoat composition including an aluminium phase including aluminium; applying the basecoat composition on the surface of the substrate to form a basecoat layer; heating the basecoat layer to a first temperature for a predetermined period of time; applying a glow discharge plasma on the basecoat layer; and heating the basecoat layer to a second temperature greater than the first temperature, in order to activate an exothermic reaction between at least the aluminium phase of the basecoat layer and the at least one chemical element of the substrate, wherein the exothermic reaction forms the protective coating on the surface of the substrate.

20 Claims, 15 Drawing Sheets

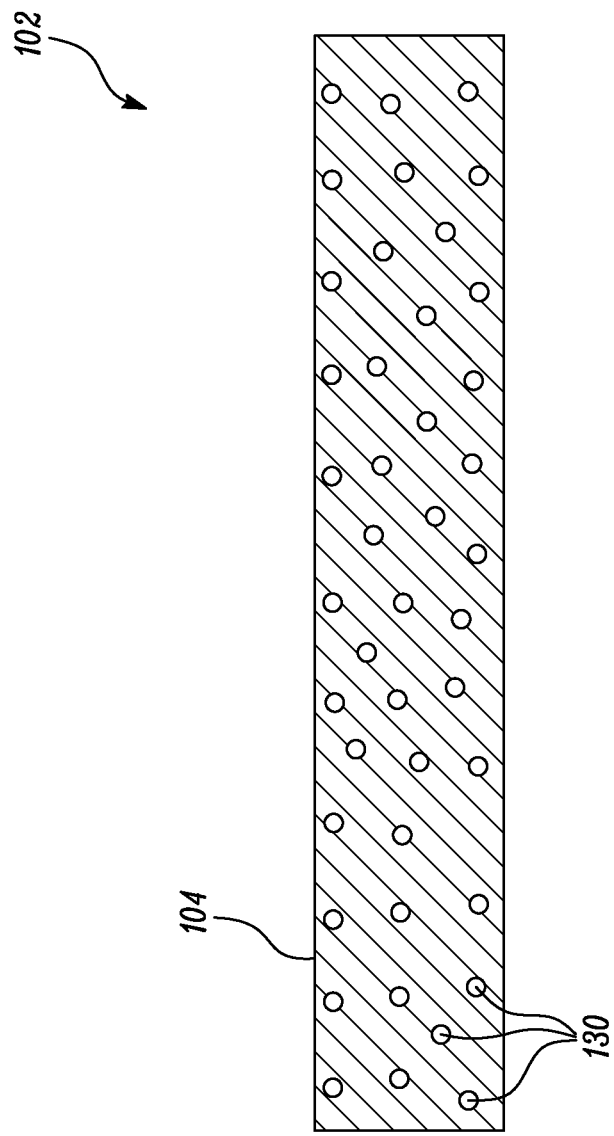

METHOD OF FORMING PROTECTIVE COATING

CROSS-REFERENCE TO RELATED APPLICATIONS

This specification is based upon and claims the benefit of priority from United Kingdom patent application number GB 2118927.9 filed on Dec. 23, 2021, the entire contents of which is incorporated herein by reference.

BACKGROUND

Technical Field

The present disclosure relates to a protective coating, a coated article, and a method of forming the protective coating.

Description of the Related Art

Existing corrosion protective coatings for gas turbine engine components (e.g., turbine discs) are aimed at protection against low temperature hot corrosion. Such corrosion protective coatings are formed using traditional methods, such as chemical vapour deposition (CVD), electroplating, deposition of a reactive metal (e.g., aluminium) within a binder material (e.g., a phosphate), and thermal/plasma spray methods that permit deposition of a corrosion resistant alloy onto a surface of the components.

Most current coating processes require processing at high temperatures, typically above 900° C., or a subsequent heat-treatment of the coating above such temperatures as part of the coating process. For certain components of gas turbine engines (e.g., turbine discs), it is critical that the temperatures involved in the coating process should be kept below certain temperatures (e.g., 900° C.) to preserve optimum mechanical properties of materials of those components.

SUMMARY

According to a first aspect there is provided a method of forming a protective coating. The method includes providing a substrate including at least one chemical element and a surface. The method further includes forming a basecoat composition including an aluminium phase including aluminium. The method further includes applying the basecoat composition on the surface of the substrate to form a basecoat layer. The method further includes heating the basecoat layer to a first temperature for a predetermined period of time. The method further includes applying a glow discharge plasma on the basecoat layer and heating the basecoat layer to a second temperature greater than the first temperature in order to activate an exothermic reaction between at least the aluminium phase of the basecoat layer and the at least one chemical element of the substrate. The exothermic reaction forms the protective coating on the surface of the substrate.

The disclosed method restricts the process of formation of the protective coating on the surface of the substrate to the second temperature ensuring that optimum mechanical properties of the substrate are preserved. The method is based on developing the basecoat composition (e.g., a slurry) which may be sprayed, painted or otherwise applied, cheaply and efficiently on the surface of the substrate. Further, the basecoat composition may support reactive elements (i.e., the aluminium phase) during application on the surface of the substrate, whilst providing environmental protection to the reactive elements during handling and subsequent heat treatment of the basecoat layer. Specifically, heating the basecoat layer to the first temperature may cure the basecoat layer, thereby providing environmental protection to the aluminium phase of the basecoat composition.

When the basecoat layer is heated to the second temperature, the aluminium phase of the basecoat composition may interdiffuse with the surface of the substrate forming the protective coating on the substrate. The proposed method is robust, but simple, and may be easily implemented in factory environments.

In some embodiments, the at least one chemical element is nickel.

In some embodiments, the exothermic reaction between at least the aluminium phase of the basecoat layer and nickel produces nickel aluminide. Nickel aluminide in the protective coating may provide desirable corrosion resistance to the substrate.

In some embodiments, the basecoat layer includes a binder phase including at least one of a phosphate salt and a chromate salt. In some embodiments, the aluminium phase is dispersed in the binder phase. The binder phase may be capable of carrying and protecting the aluminium phase dispersed in the binder phase while the basecoat layer is heated to the second temperature.

In some embodiments, the method further includes eliminating the binder phase from the protective coating. The chemical composition of the binder phase (that includes phosphate) may lead to a formation of low melting point eutectics, e.g., with sodium sulphate typically present in environment. Thus, the binder phase is removed from the protective coating.

In some embodiments, the method further includes removing a plurality of projections extending from a major surface of the protective coating. In some embodiments, the plurality of projections is formed during the exothermic reaction. The plurality of projections may be removed as part of a surface finishing of the substrate after formation of the protective coating.

In some embodiments, the basecoat composition comprises, in weight percent, at least about 50% aluminium.

In some embodiments, forming the basecoat composition further includes forming a solution including phosphoric acid. In some embodiments, forming the basecoat composition further includes adding aluminium hydroxide to the solution. In some embodiments, forming the basecoat composition further includes adding the aluminium phase to the solution. In some embodiments, forming the basecoat composition further includes stirring the solution to obtain the basecoat composition including aluminium hydrogen phosphate and the aluminium phase. The solution may be capable of carrying and protecting the aluminium phase dispersed in the solution for further processing and subsequent heat treatment of the basecoat layer.

In some embodiments, the method further includes treating the aluminium phase with a halide-based wash coat solution prior to adding the aluminium phase to the solution. Treating the aluminium phase with the halide-based wash coat solution may encourage vapour phase transport of aluminium and other alloying elements associated with the aluminium phase to the surface of the substrate during heating of the basecoat layer. Thus, treating the aluminium phase with the halide-based wash coat solution may enhance the exothermic reaction between the aluminium phase and the at least one chemical element.

In some embodiments, the halide-based wash coat solution includes at least one of nickel chloride, ammonium chloride, and cobalt chloride. Chlorine present in the halide-based wash coat solution may help transport of aluminium associated with the aluminium phase to the surface of the substrate during heating of the basecoat layer.

In some embodiments, a ratio of a weight of phosphoric acid to a weight of aluminium hydroxide is about 3:1. Such a ratio of the weight of phosphoric acid to the weight of aluminium hydroxide may produce a hard layer when the basecoat layer is heated to the first temperature. The hard layer may be highly resistant to damage, thereby providing optimum mechanical protection of the aluminium phase against handling damage. Additionally, this ratio may enable any particulates (e.g., alloying elements) suspended in the solution to be held significantly longer than other ratios, thereby improving reproducibility and consistency of formation of the protective coating.

In some embodiments, the aluminium phase of the basecoat composition includes at least one of pure aluminium, an aluminium-chromium alloy, an aluminium-niobium alloy, an aluminium-tantalum-alloy, an aluminium-manganese alloy, an aluminium-silicon alloy, an intermetallic aluminium alloy, and an aluminium alloy comprising at least 50% aluminium.

In some embodiments, the basecoat composition further includes at least one of niobium, tantalum, chromium and manganese. Inclusion of such elements may provide desirable properties to the protective coating.

In some embodiments, the basecoat composition further includes at least one of yttrium, zirconium, hafnium and silicon. Such elements may improve oxidation resistance of the basecoat composition during intermediate stages of the formation of the protective coating.

Heating the basecoat layer to the second temperature further includes applying a glow discharge plasma on the basecoat layer. Application of the glow discharge plasma on the basecoat layer involves exposing the basecoat layer to ionising radiation produced by the glow discharge plasma. The ion bombardment then triggers the exothermic reaction between the aluminium phase of the basecoat layer and the at least one chemical element of the substrate, thereby forming the protective coating in situ.

Localized application of the glow discharge plasma on the basecoat layer may allow formation of the protective coating without the need to heat up a bulk of the substrate, saving both time (as heating up the bulk may need a significant period of time, as well as the time to cool from the heat-treatment temperature) and energy (as a significant thermal energy input is needed to heat up the bulk of the substrate to the required heat-treatment temperature and to maintain that temperature). Further, a mass of the substrate may be used as a heat sink to remove thermal energy from the surface of the substrate during the exothermic reaction and post formation of the protective coating.

In some embodiments, the glow discharge plasma is generated using a pulsed direct current (DC) power supply. Pulsed DC power supply may enable improved control over the glow discharge plasma while allowing simplification of electrodes used for the generation of the glow discharge plasma.

In some embodiments, the first temperature is about 250 degrees Celsius (° C.). Such a temperature may be sufficient to cure the basecoat layer to produce a hard layer that may be difficult to damage, thereby offering optimum mechanical protection of the aluminium phase against handling damage.

In some embodiments, the second temperature is less than or equal to 900 degrees Celsius. Heating the basecoat layer to the second temperature that is less than or equal to 900 degrees Celsius may allow formation of the protective coating on certain components (e.g., blade root portions of blades) of gas turbine engines where such temperatures may be utilized while preserving the optimum mechanical properties of that component.

In some embodiments, the second temperature is less than or equal to 800 degrees Celsius. Heating the basecoat layer to the second temperature that is less than or equal to 800 degrees Celsius may activate the exothermic reaction based on the application of the glow discharge plasma for heating the basecoat layer to the second temperature.

In some embodiments, the second temperature is from about 750 degrees Celsius to about 850 degrees Celsius. Heating the basecoat layer to the second temperature that is from about 750 degrees Celsius to about 850 degrees Celsius may activate the exothermic reaction without using the glow discharge plasma.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 5 is a schematic sectional view of a substrate, according to an embodiment of the present disclosure;

DETAILED DESCRIPTION

Aspects and embodiments of the present disclosure will now be discussed with reference to the accompanying figures. Further aspects and embodiments will be apparent to those skilled in the art.

As used in, the term "particulate" generally refers to a particle, powder, flake, etc., that inherently exists in a relatively small form, or may be formed by, e.g., grinding, shredding, fragmenting, pulverizing or otherwise, subdividing a larger form of material into a relatively smaller form.

Figure 1:
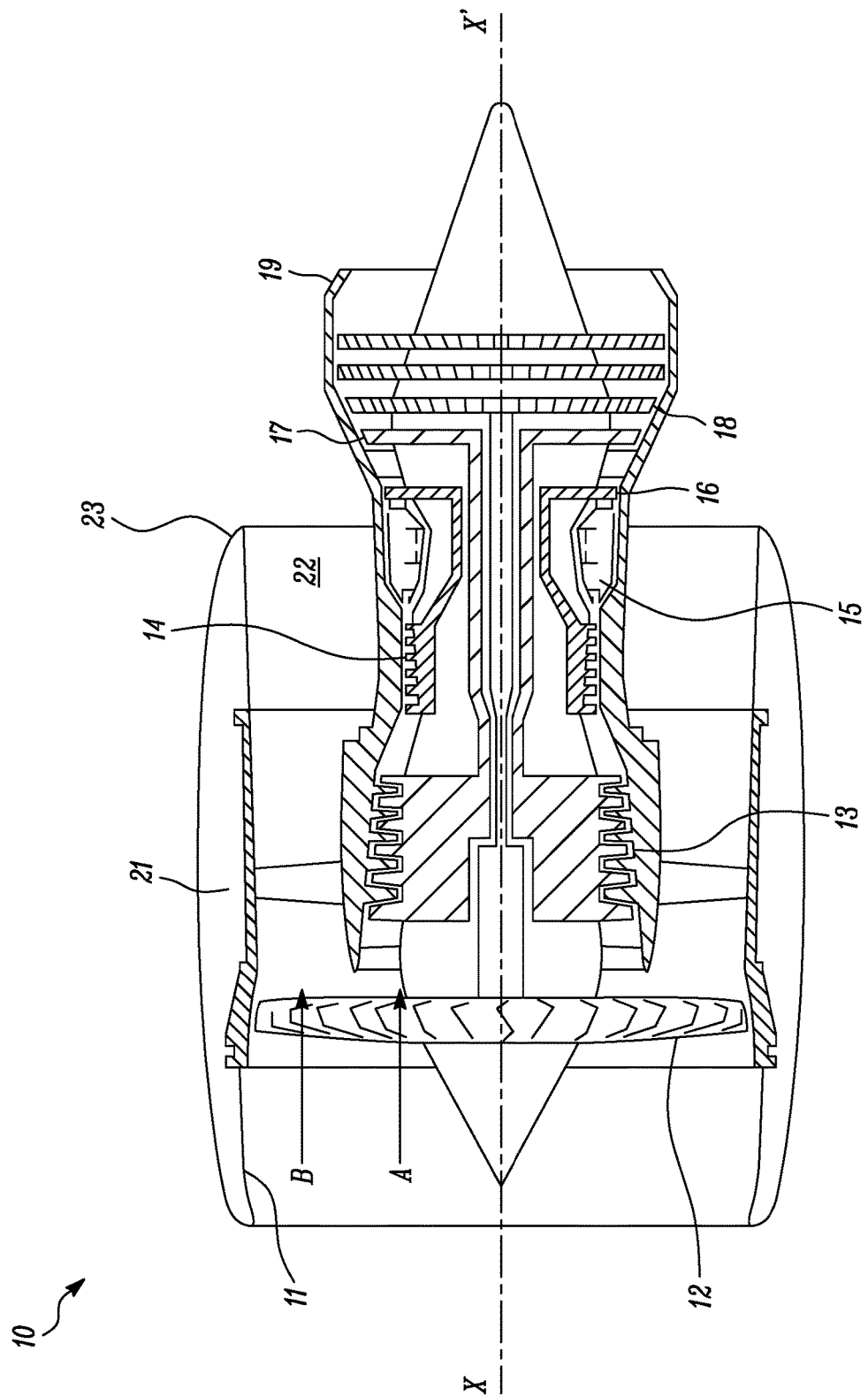
FIG. 1 is a schematic sectional view of a gas turbine engine, according to an embodiment of the present disclosure.

FIG. 1 shows a ducted gas turbine engine 10 having a principal rotational axis X-X'. The gas turbine engine 10 includes, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18, and a core engine exhaust nozzle 19. A nacelle 21 generally surrounds the gas turbine engine 10 and defines the air intake 11, a bypass duct 22 and a bypass exhaust nozzle 23.

During operation, air entering the air intake 11 is accelerated by the propulsive fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high pressure compressor 14 where further compression takes place.

The compressed air exhausted from the high pressure compressor 14 is directed into the combustion equipment 15 where it is mixed with fuel and the mixture is combusted. The resultant hot combustion products then expand through, and thereby drive the high, intermediate and low pressure turbines 16, 17, 18 before being exhausted through the core engine exhaust nozzle 19 to provide additional propulsive thrust. The high, intermediate and low pressure turbines 16, 17, 18 respectively drive the high and intermediate pressure compressors 14, 13 and the propulsive fan 12 by suitable interconnecting shafts.

In some embodiments, the gas turbine engine 10 is used in an aircraft. In some embodiments, the gas turbine engine 10 is an ultra-high bypass ratio engine (UHBPR).

In addition, the present disclosure is equally applicable to aero gas turbine engines, marine gas turbine engines, and land-based gas turbine engines.

Figure 2:
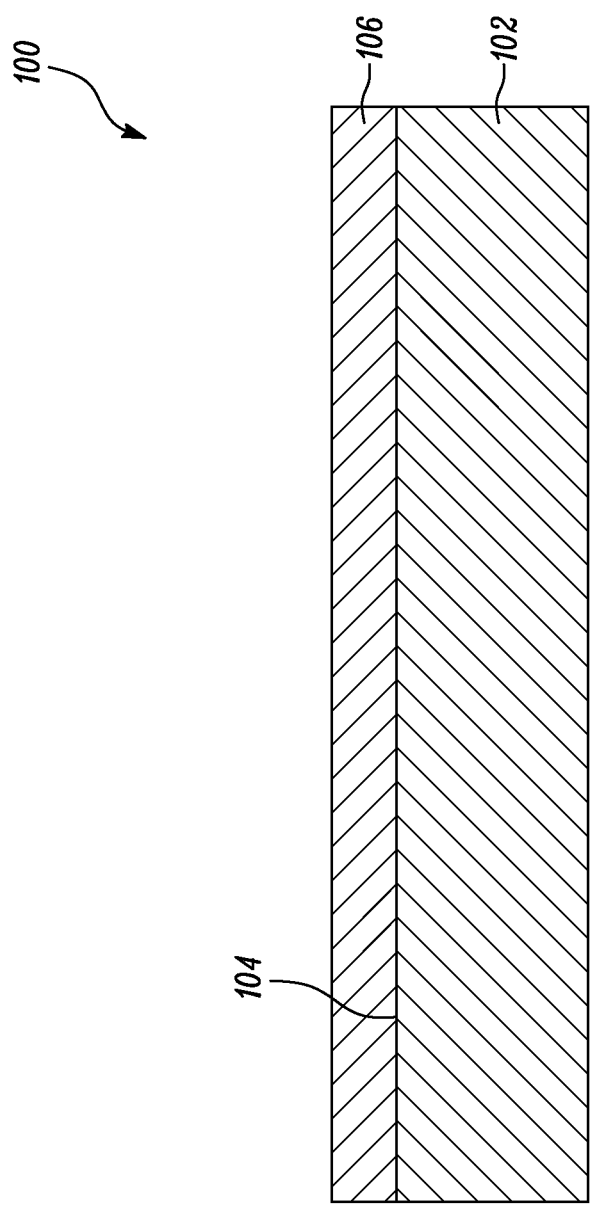
FIG. 2 is a schematic sectional view of a coated article associated with the gas turbine engine of FIG. 1, according to an embodiment of the present disclosure.

FIG. 2 illustrates a schematic sectional side view of a coated article 100. In some embodiments, the gas turbine engine 10 (shown in FIG. 1) includes the coated article 100. The coated article 100 includes a substrate 102 including a surface 104. In some embodiments, the coated article 100 further includes a protective coating 106. The protective coating 106 is disposed on the surface 104 of the substrate 102. In some embodiments, the protective coating 106 is positioned to define an external surface of the substrate 102, such that the protective coating 106 is directly exposed to extreme temperature conditions (e.g., hot gas flow path), and may improve oxidation and corrosion resistance of the substrate 102. The protective coating 106 may have, in certain embodiments, a thickness from about 20 microns (μm) to about 300 μm.

In some embodiments, the protective coating 106 may have a coefficient of thermal expansion (CTE) that closely matches that of the substrate 102 and may exhibit limited mechanical property interactions with a material of the substrate 102 over an extended period of time at elevated temperatures. Furthermore, the protective coating 106 may be capable of being metallurgically bonded to the material of the substrate 102 to be highly resistant to spalling.

Figure 3B:
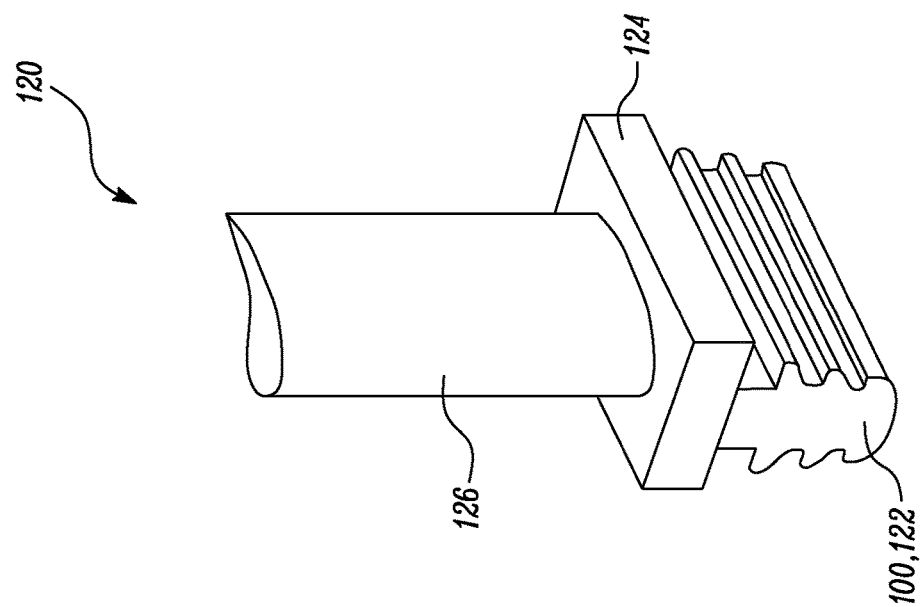
FIG. 3B is a schematic perspective view of a blade of the gas turbine engine of FIG. 1, according to an embodiment of the present disclosure.
Figure 3A:
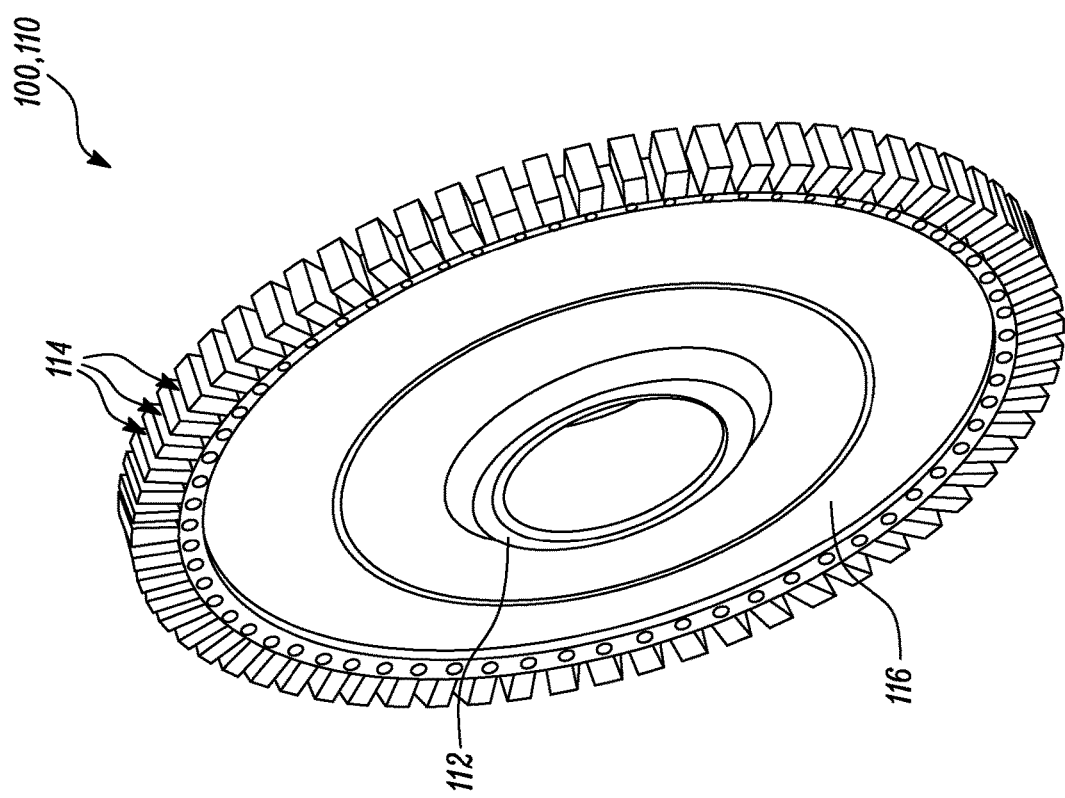
FIG. 3A is a schematic perspective view of a turbine disc of the gas turbine engine of FIG. 1, according to an embodiment of the present disclosure.

FIG. 3A illustrates a schematic perspective view of a turbine disc 110 of the gas turbine engine 10 (shown in FIG. 1). The turbine disc 110 may be, e.g., a disc of the high pressure turbine 16, the intermediate pressure turbine 17 or the low pressure turbine 18 shown in FIG. 1. In the illustrated embodiment of FIG. 3A, the coated article 100 is the turbine disc 110. In some embodiments, the turbine disc 110 includes a hub 112 arranged along the primary rotational axis X-X' (shown in FIG. 1) of the gas turbine engine 10 (shown in FIG. 1). In some embodiments, the turbine disc 110 further includes a bore through which a shaft (not shown) may extend.

In some embodiments, the turbine disc 110 further includes slots 114 arranged along an outer periphery of the turbine disc 110 into which turbine blades (not shown) may be inserted. In some embodiments, a web section 116 of the turbine disc 110 extends between the outer periphery, where the slots 114 are located, and the hub 112. In some embodiments, the protective coating 106 (shown in FIG. 2) may be disposed on the web section 116 of the turbine disc 110 and/or the slots 114, which are is directly exposed to extreme temperatures. However, it should be understood that the protective coating 106 (shown in FIG. 2) may be utilized anywhere on the turbine disc 110 and the substrate 102 (shown in FIG. 2) may be any portion of the turbine disc 110.

FIG. 3B illustrates a schematic perspective view of a blade 120 of the gas turbine engine 10 (shown in FIG. 1). The blade 120 includes a blade root 122, a platform 124 coupled to the blade root 122, and an aerofoil 126 coupled to the platform 124. In some embodiments, the blade root 122, the platform 124 and the aerofoil 126 may be a single piece construction or may be separate components joined together. The platform 124 may be sandwiched between the blade root 122 and the aerofoil 126 and may separate the blade root 122 from the aerofoil 126 such that gasses passing over the aerofoil 126 may be blocked from moving down towards the blade root 122. The aerofoil 126 may be shaped aerodynamically to interact with gases moving over the blade 120.

In some embodiments, the blade root 122 may be arranged to couple the blade 120 with a disc (e.g., the turbine disc 110 shown in FIG. 3A). In some embodiments, the coated article 100 is the blade root 122 the blade 120. Specifically, the protective coating 106 may be disposed on the blade root 122 of the blade 120 under the platform 124 that enables the blade 120 to operate at high temperatures.

Those skilled in the art will appreciate that the teachings and benefits of an embodiment of the present disclosure are also applicable to compressor discs and blisk of gas turbine engines, as well as numerous other components that are subjected to stresses at high temperatures, and therefore, require resistance from oxidation and corrosion.

In the disclosure, embodiments are described hereinafter in detail for a method of forming a protective coating (e.g., the protective coating 106) on a substrate (e.g., the turbine disc 110 or the blade root 122). A skilled person will appreciate that the methods and processes described hereinafter are not limited to this use and application only, and those methods and processes are described by way of an example for forming the protective coating on the substrate using the described methods and processes.

Figure 4:
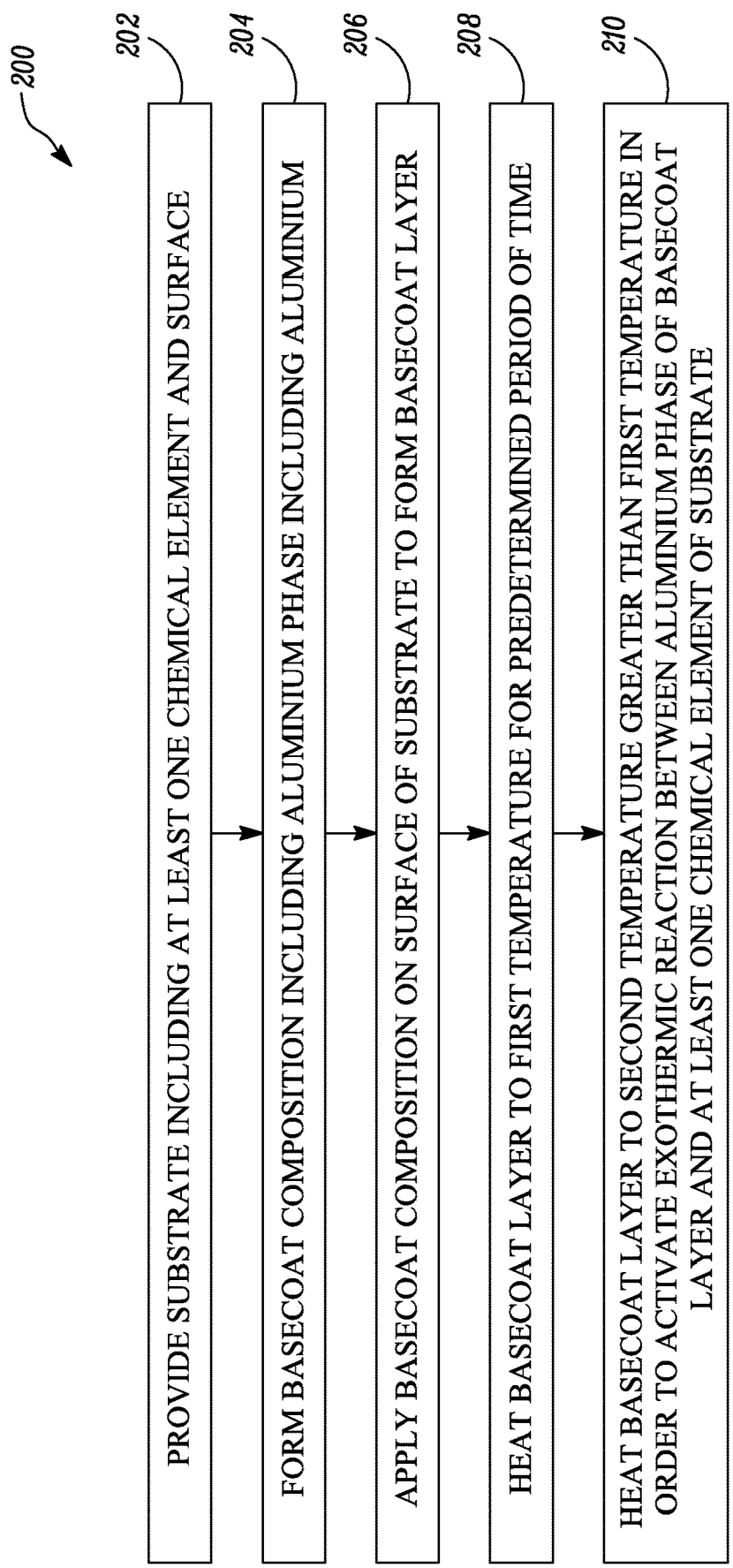
FIG. 4 is a flow chart illustrating a method of forming a protective coating, according to an embodiment of the present disclosure.

FIG. 4 is a flow chart illustrating a method 200 of forming a protective coating. In some embodiments, the protective coating may be similar to the protective coating 106 described with reference to FIG. 2. The method 200 will be described hereinafter with reference to the coated article 100 of FIG. 2 and FIGS. 4-8.

FIG. 5 illustrates a schematic sectional view of the substrate 102, according to an embodiment of the present disclosure. Referring now to FIGS. 4 and 5, at step 202, the method 200 includes providing the substrate 102 including at least one chemical element 130 and the surface 104. In some embodiments, the at least one chemical element 130 is nickel. It should be understood that nickel is described hereinafter as the at least one chemical element 130 by way of example only, and the at least one chemical element 130 may be any element based on application requirements. Further, it should be understood that the at least one chemical element 130 is schematically shown in FIG. 5 for descriptive and illustrative purposes.

Suitable alloys for the substrate 102 may include, but are not limited to, nickel-based superalloys, cobalt-based superalloys, iron-based superalloys, low sulphur nickel-based superalloys, low sulphur cobalt-based superalloys, low sulphur iron-based superalloys, etc. Such superalloys may typically include a polycrystalline structure, but may have portions with a single-crystal or directionally solidified crystalline structure. In some embodiments, the substrate 102 may include nickel-based superalloys commercially available under the trademark Inconel®.

Referring now to FIG. 4, at step 204, the method 200 further includes forming a basecoat composition 140 (shown in FIG. 6D) including an aluminium phase 142 (shown in FIG. 6D) including aluminium. FIGS. 6A-6D illustrate steps of forming the basecoat composition 140 (shown in FIG. 6D). Specifically, formation of the basecoat composition 140 will be described with reference to FIGS. 6A-6D.

Figure 6A:
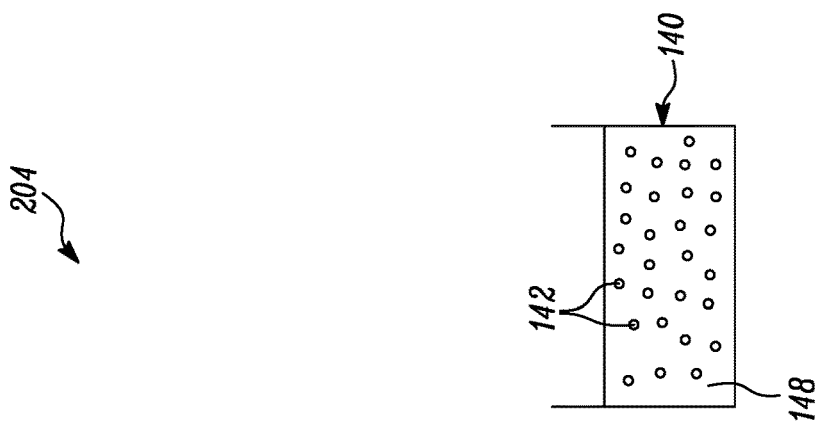
FIGS. 6A-6D illustrate various steps of forming a basecoat composition, according to an embodiment of the present disclosure.

Referring now to FIGS. 4 and 6A, forming the basecoat composition 140 (shown in FIG. 6D) at step 204 further includes forming a solution 144 including phosphoric acid ($H_3PO_4$). In some embodiments, the solution 144 maybe formed by diluting a required mass of phosphoric acid, e.g., with water.

Figure 6B:
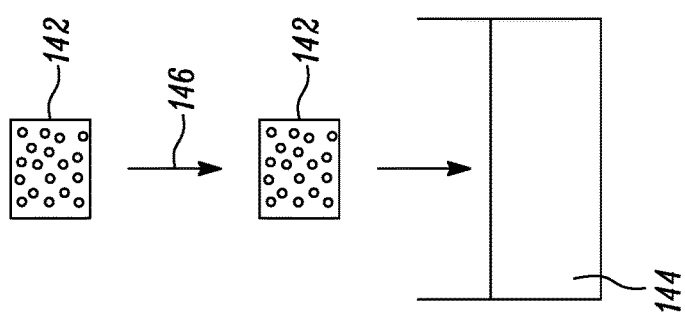

Referring now to FIGS. 4 and 6B, forming the basecoat composition 140 (shown in FIG. 6D) at step 204 further includes adding aluminium hydroxide ($Al(OH)_3$) 141 to the solution 144. In some embodiments, a ratio of a weight of phosphoric acid to a weight of aluminium hydroxide is about 3:1. In some embodiments, the ratio of the weight of phosphoric acid to the weight of aluminium hydroxide may vary from about 1:1 to about 23:1, preferably 3:1.

Figure 6C:
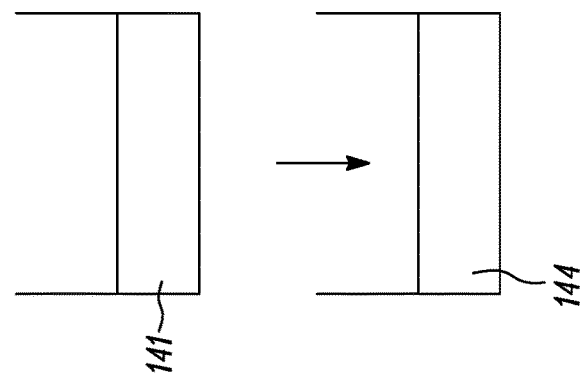

Referring now to FIGS. 4 and 6C, forming the basecoat composition 140 (shown in FIG. 6D) at step 204 further includes adding the aluminium phase 142 to the solution 144. In some embodiments, the aluminium phase 142 may be added to the solution 144 in the form of powder or particulates. In some embodiments, the aluminium phase 142 of the basecoat composition 140 (shown in FIG. 6D) includes at least one of pure aluminium, an aluminium-chromium alloy, an aluminium-niobium alloy, an aluminium-tantalum-alloy, an aluminium-manganese alloy, an aluminium-silicon alloy, an intermetallic aluminium alloy, and an aluminium alloy comprising at least 50% aluminium.

Additionally, in some embodiments, other alloying elements may be added to the aluminium phase 142 such that the final basecoat composition 140 (shown in FIG. 6D) further includes at least one of niobium, tantalum, chromium and manganese. In some embodiments, the aluminium phase 142 may be a high entropy mix of aluminium, niobium, tantalum, chromium and manganese.

Further, in some embodiments, the basecoat composition 140 may further include at least one of yttrium, zirconium, hafnium and silicon. Specifically, the aluminium phase 142 may contain a minor addition of other elements, including, but not limited to, yttrium, zirconium, hafnium and/or silicon as active elements. Such alloying elements may improve oxidation resistance of the aluminium phase 142 in the basecoat composition 140 (shown in FIG. 6D) during intermediate stages of formation of the protective coating 106 (shown in FIG. 2). Further, silicon and other allowing elements may be added to the aluminium phase 142 as an aluminium alloy or separately. Other optional additions including, but not limited to, lanthanum, cerium, magnesium, and other rare earth or reactive metals, may also be added to obtain enhanced environmental resistance.

In some embodiments, the aluminium phase 142 may be added to the solution 144 as an aluminium eutectic. Generally, aluminium eutectics are low melting mixtures of aluminium and other alloying elements desirable for further processing.

In some embodiments, the method 200 further includes treating the aluminium phase 142 with a halide-based wash coat solution 146 or a mixed blend of halide-based salts prior to adding the aluminium phase 142 to the solution 144. In some embodiments, treating the aluminium phase 142 with the halide-based wash coat solution 146 may encourage vapour phase transport of aluminium, chromium, silicon, titanium, tantalum, niobium, manganese and other alloying elements to the surface 104 (shown in FIG. 2) during further processing. In some embodiments, the halide-based wash coat solution 146 includes at least one of nickel chloride, ammonium chloride, and cobalt chloride.

Figure 6D:
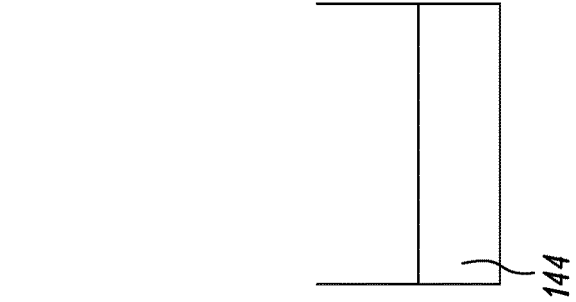

Referring now to FIGS. 4 and 6D, forming the basecoat composition 140 at step 204 further includes stirring the solution 144 (shown in FIG. 6C) to obtain the basecoat composition 140 including aluminium hydrogen phosphate (i.e., a binder phase 148) and the aluminium phase 142. In some embodiments, stirring the solution 144 (shown in FIG. 6C) leads to a chemical reaction between phosphoric acid and aluminium hydroxide leading to the formation of aluminium hydrogen phosphate. In some embodiments, the aluminium phase 142, along with the other alloying elements, may remain suspended in aluminium hydrogen phosphate, which may act as a binder for the aluminium phase 142. In some embodiments, the binder phase 148 may be capable of carrying and protecting the aluminium phase 142 as the basecoat composition 140 is further processed.

In some embodiments, the basecoat composition 140 includes, in weight percent, at least about 50% aluminium. In some embodiments, the basecoat composition 140 includes, in weight percent, at least about 55%, at least about 60%, at least about 65%, at least about 70% or at least about 75% aluminium. It should be understood that the aluminium phase 142 is schematically shown dispersed in the binder phase 148 for illustrative purposes.

It should be understood that the binder phase 148 may include other salts instead of aluminium hydrogen phosphate (a phosphate salt), e.g., a chromate salt, based on application requirements. Specifically, in some embodiments, the binder phase 148 includes at least one of a phosphate salt and a chromate salt. Desired composition of the binder phase 148 may be obtained by appropriately choosing the initial reaction elements.

Figure 7:
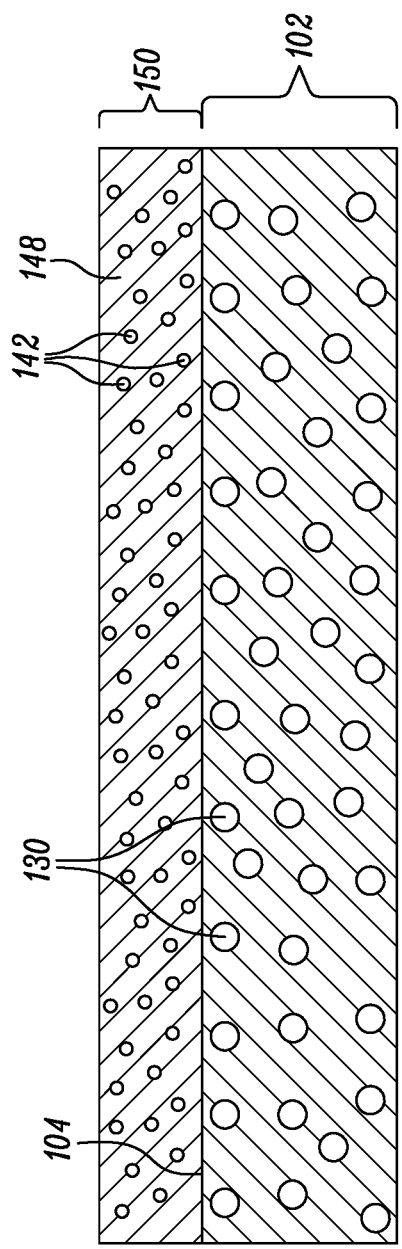
FIG. 7 is a schematic sectional view of the substrate and a basecoat layer upon application of the basecoat composition on a surface of the substrate, according to an embodiment of the present disclosure.

FIG. 7 illustrates a schematic sectional side view of the substrate 102 and a basecoat layer 150. Referring now to FIGS. 4 and 7, at step 206, the method 200 further includes applying the basecoat composition 140 (shown in FIG. 6D) on the surface 104 of the substrate 102 to form the basecoat layer 150. In some embodiments, the basecoat composition 140 (shown in FIG. 6D) may be applied on the surface 104 of the substrate 102 using any known method, e.g., brush application, solvent spray deposition, electrostatic spray deposition, dip coating, etc. Such methods may be cheap and efficient as well.

In some embodiments, prior to application of the basecoat composition 140 on the surface 104 of the substrate 102, the surface 104 may be pre-treated mechanically, chemically, or both to prepare the surface 104 for reception of the basecoat composition 140 (shown in FIG. 6D). Suitable pre-treatment methods may include grit blasting, micromachining, laser etching, treatment with chemical etchants, treatment with pressurized water, and the like, as well as combinations of the one or more aforementioned methods.

In some embodiments, the basecoat layer 150 includes the binder phase 148 that may include hydrated aluminium hydrogen phosphate (a phosphate salt). In some embodiments, the aluminium phase 142 is dispersed in the binder phase 148 as shown schematically in FIG. 7. Thus, at least a portion of the aluminium phase 142 may be in direct contact with the at least one chemical element 130 of the substrate 102 through the surface 104 of the substrate 102. The binder phase 148 may support and protect aluminium and other alloying elements present in the aluminium phase 142 such that the basecoat composition 140 (shown in FIG. 6D) may be easily applied on the surface 104 of the substrate 102 in factory environments.

Decreasing a thickness of the basecoat layer 150 may result in thinner end coatings. In some embodiments, a thickness of the protective coating 106 (shown in FIG. 2) may be controlled over a wide range, from about 20 μm to about 300 μm, according to application requirements. The thickness of the protective coating 106 may be controlled by controlling the thickness of the basecoat layer 150. Typically, thinner coatings, below 50 μm, may be obtained by depositing the basecoat layer 150 by an aerosol spray technique, while thicker coatings may be obtained by depositing the basecoat layer 150 by brush coating or dip coating methods.

Figure 8:
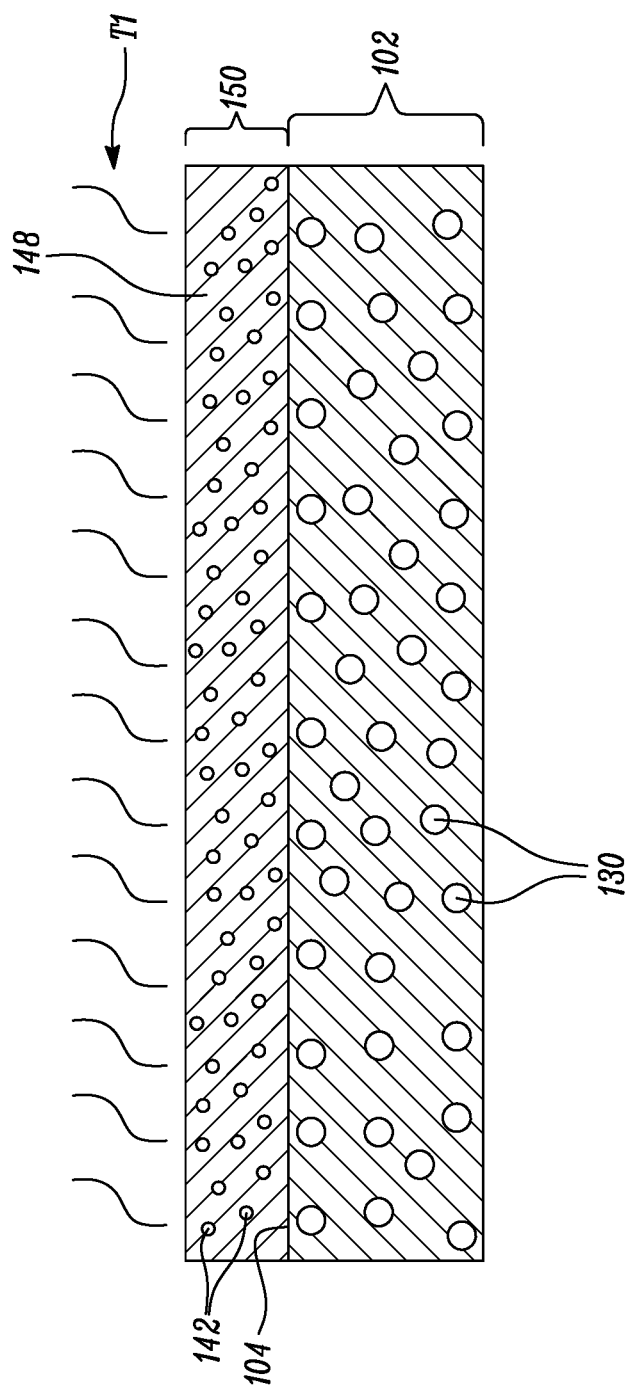
FIG. 8 is a schematic sectional view of the substrate and the basecoat layer where the basecoat layer is heated to a first temperature, according to an embodiment of the present disclosure.

FIG. 8 illustrates a schematic sectional side view of the substrate 102 and the basecoat layer 150. Referring now to FIGS. 4 and 8, at step 208, the method 200 further includes heating the basecoat layer 150 to a first temperature T1 for a predetermined period of time. In some embodiments, the first temperature T1 is about 250 degrees Celsius (° C.). In some embodiments, the predetermined period of time may be, for example, about 12 hours, however, the predetermined period of time may depend upon factors, such as the composition of the basecoat layer 150. In some embodiments, the basecoat layer 150 may be heated to cure the basecoat layer 150 and provide environmental protection to the aluminium phase 142 dispersed in the binder phase 148 of the basecoat layer 150 during handling and subsequent processing.

In some embodiments, the ratio (i.e., 3:1) of the weight of phosphoric acid to the weight of aluminium hydroxide in the solution 144 (shown in FIG. 6B) may enable, after heating, formation of the basecoat layer 150 that is hard and difficult to damage, enabling optimum mechanical protection against handling damage. Additionally, this ratio of the weight of phosphoric acid to the weight of aluminium hydroxide in the solution 144 (shown in FIG. 6B) may retain any particulates (i.e., the alloying elements), suspended in the solution 144 (shown in FIG. 6C), significantly longer than other ratios, thereby improving reproducibility and consistency of formation of the protective coating 106 (shown in FIG. 2).

Figure 9:
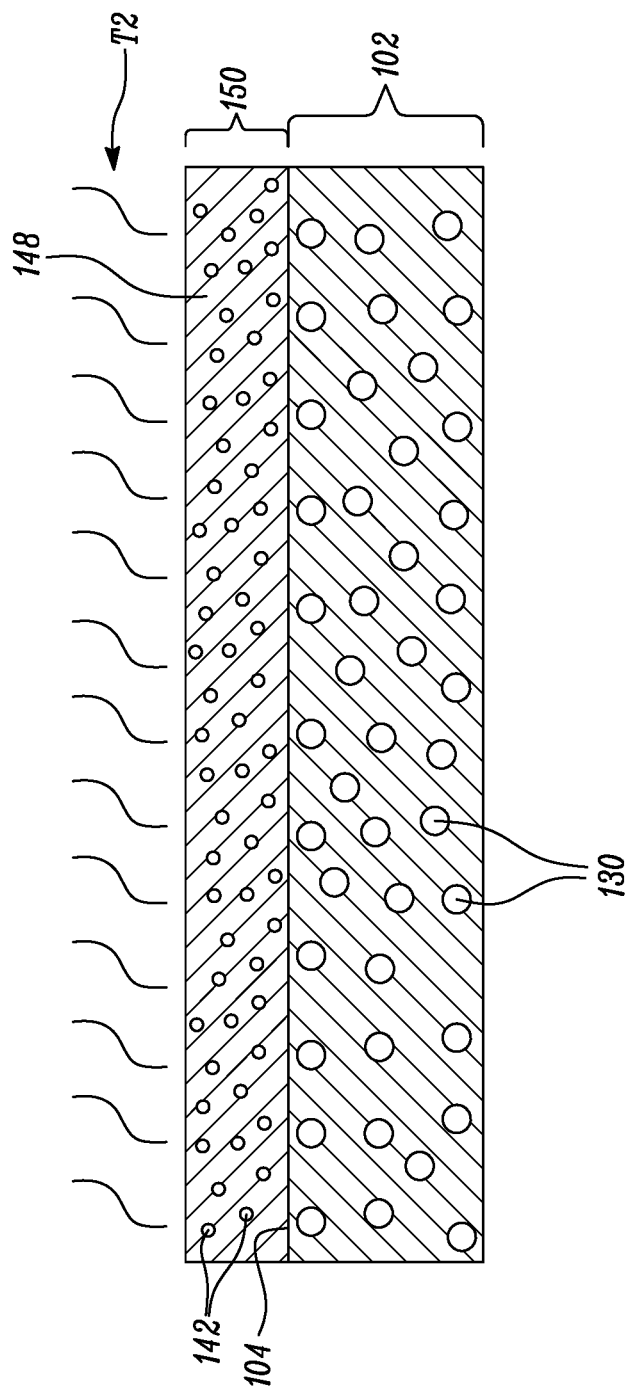
FIG. 9 is a schematic sectional view of the substrate and the basecoat layer where the basecoat layer is heated to a second temperature, according to an embodiment of the present disclosure.

FIG. 9 illustrates a schematic sectional side view of the substrate 102 and the basecoat layer 150. Referring now to FIGS. 4 and 9, at step 210, the method 200 further includes heating the basecoat layer 150 to a second temperature T2 greater than the first temperature T1 in order to activate an exothermic reaction between at least the aluminium phase 142 of the basecoat layer 150 and the at least one chemical element 130 of the substrate 102. In other words, heating the basecoat layer 150 provides the activation energy for the exothermic chemical reaction between at least a portion of the aluminium phase 142 present in the basecoat layer 150 adjacent to the surface 104 of the substrate 102 and the at least one chemical element 130 of the substrate 102. During the exothermic reaction, the aluminium phase 142 of the basecoat layer 150 may interdiffuse with the substrate 102, thereby forming the protective coating 106 (shown in FIG. 2) on the surface 104 of the substrate 102. In some embodiments, the exothermic reaction may take place in air or in a controlled environment.

In some embodiments, the second temperature T2 is less than or equal to 900 degrees Celsius. Such temperatures may be utilized for forming the protective coating 106 (shown in FIG. 2) on the blade root 122 of the blade 120 below the platform 124 (shown in FIG. 3B). Selecting such values of the second temperature T2 may allow formation of the protective coating 106 (shown in FIG. 2) without significant change in mechanical properties of the blade root 122 (shown in FIG. 3B).

In some embodiments, the second temperature T2 is from about 750 degrees Celsius to about 850 degrees Celsius. Such temperatures may be utilized for forming the protective coating 106 (shown in FIG. 2) on surfaces of the turbine disc 110 (shown in FIG. 3A).

Heating the basecoat layer 150 to the second temperature T2 may provide the initial energy to activate the exothermic reaction that leads to formation of the protective coating 106 (shown in FIG. 2). As the basecoat layer 150 is heated, localized reaction occurs between the aluminium phase 142 and the at least one chemical element 130. In some embodiments, the at least one chemical element 130 may be nickel as described earlier. In some embodiments, the exothermic reaction between at least the aluminium phase 142 of the basecoat layer 150 and nickel produces nickel aluminide.

Although the exothermic reaction may be activated at the second temperature T2 of about 650 degrees Celsius, a self-propagating exothermic reaction may be achieved at the second temperature T2 of about 800 degrees Celsius. Such an exothermic reaction may lead to a formation of a nickel aluminide coating with desirable thickness.

The exothermic reaction may be enhanced by treatment of the aluminium phase 142 with the halide-based wash coat solution 146 (Shown in FIG. 6C). This may allow transport of aluminium present in the aluminium phase 142 towards the surface 104 of the substrate 102 for exothermic reaction with the at least one chemical element 130 (e.g., nickel). The halide-based wash coat solution 146 may include nickel chloride. Since the substrate 102 already contains nickel as the at least one chemical element 130, treatment of aluminium phase 142 with the halide-based wash coat solution 146 may not lead to addition of any other element to the final coating. Further, in this example, chlorine may facilitate the transport of aluminium towards the surface 104 of the substrate 102, and may be eliminated during heating of the basecoat layer 150 to the second temperature T2.

In some embodiments, use of eutectic aluminium alloy powders may allow the exothermic reaction to be customised based on application requirements, by either lowering the aluminium alloy melting point, adding alloy elements that increase hot corrosion resistance, and/or adding alloy elements that increase the exothermic energy release.

Figure 10:
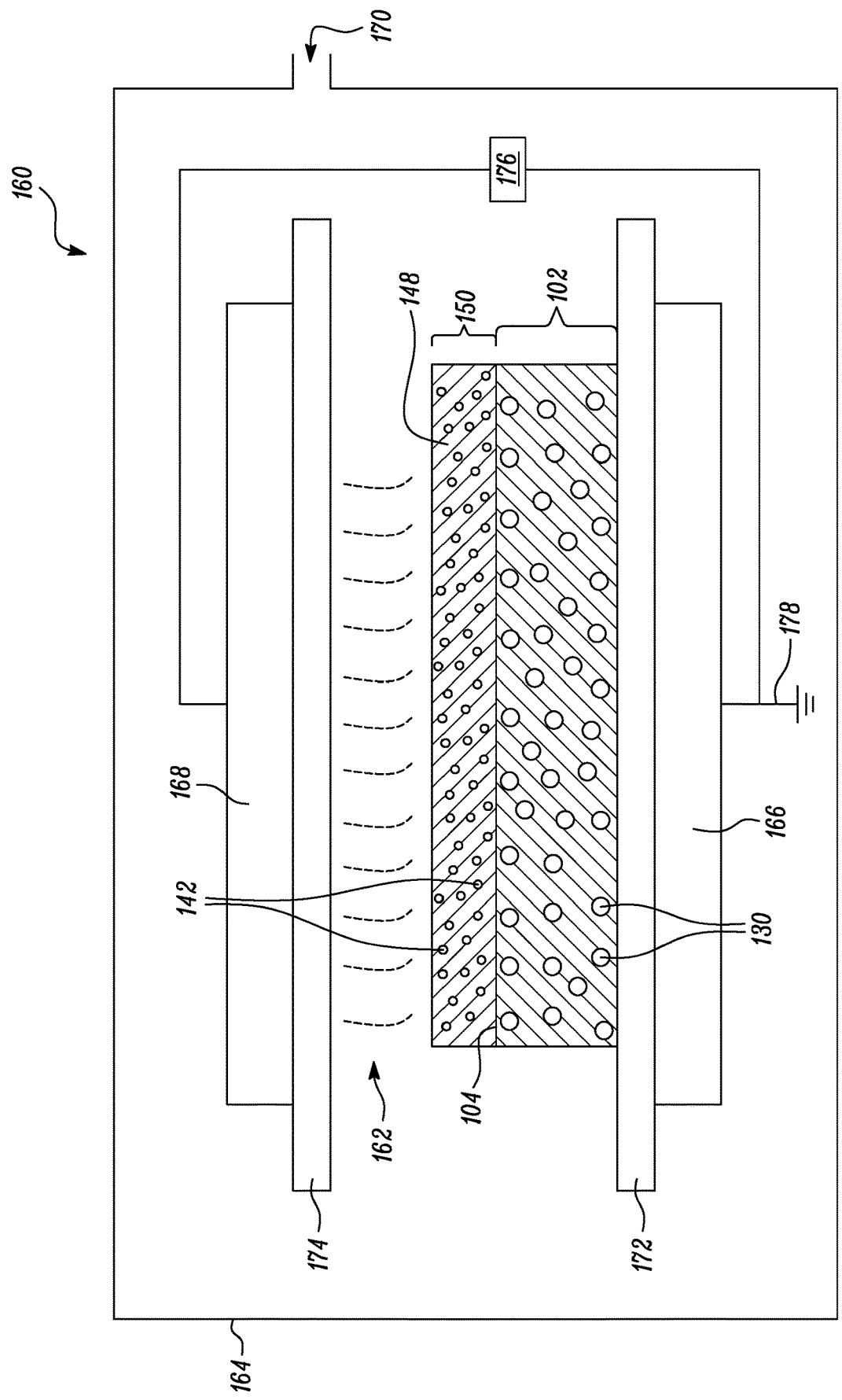
FIG. 10 is a schematic view of an apparatus for applying glow discharge plasma on the basecoat layer, according to an embodiment of the present disclosure.

FIG. 10 illustrates a schematic view of an apparatus 160 for applying glow discharge plasma 162 on the basecoat layer 150. Referring now to FIGS. 4 and 10, heating the basecoat layer 150 to the second temperature T2 at step 210 further includes applying the glow discharge plasma 162 on the basecoat layer 150. Application of the glow discharge plasma 162 on the basecoat layer 150 involves exposing the basecoat layer 150 to ionising radiation produced by the glow discharge plasma 162. The ion bombardment then activates the exothermic reaction between the aluminium phase 142 of the basecoat layer 150 and the at least one chemical element 130 of the substrate 102 present at the surface 104, thereby forming the protective coating 106 (shown in FIG. 2) in situ.

In some other embodiments, a plasma torch may be utilized for heating the basecoat layer 150 to the second temperature T2.

Localized application of the glow discharge plasma 162 on the basecoat layer 150 may allow formation of the protective coating 106 (shown in FIG. 2) without the need to heat up the bulk of the substrate 102 (e.g., the turbine disc 110 shown in FIG. 3A), saving both time (as heating up the bulk may need a significant period of time, as well as the time to cool from the heat-treatment temperature) and energy (as a significant thermal energy input is needed to heat the entire bulk of the substrate 102 to the required process temperature and to maintain that temperature). Further, a mass of the substrate 102 may be used as a heat sink to remove thermal energy from the surface 104 of the substrate 102 during the exothermic reaction and post formation of the protective coating 106 (shown in FIG. 2).

In the illustrated embodiment of FIG. 10, the basecoat layer 150 may be heated up to 800 degrees Celsius. In other words, the second temperature T2 is less than or equal to 800 degrees Celsius. Such temperatures may be beneficial for forming the protective coating 106 (shown in FIG. 2) on surfaces of the turbine disc 110 (shown in FIG. 3A) since application of heat may not lead to any significant change in mechanical properties of a material that the turbine disc 110 (shown in FIG. 3A) is typically made of (e.g., a nickel-based superalloy). Specifically, temperatures below 800 degrees Celsius may prevent over-aging of an alloy microstructure of the turbine disc 110 (shown in FIG. 3A).

The apparatus 160 includes a control chamber 164 that can be pumped down to a soft vacuum using a vacuum pump (not shown). The apparatus 160 further includes a first electrode 166 for mounting the substrate 102 along with the basecoat layer 150 to be treated. The first electrode 166 and the second electrode 168 are opposingly arranged. The second electrode 168 is spaced apart from the substrate 102 and the basecoat layer 150. A first dielectric 172 is coupled to the first electrode 166 and a second dielectric 174 is coupled to the second electrode 168. Specifically, the substrate 102 is mounted on the first dielectric 172. It should be understood that either or both the first and second electrodes 166, 168 may be covered by a respective dielectric. The first and second dielectrics 172, 174 may include a material such as Poly-ethylene Terephtalate (PET), Poly-ethylene Napthalate (PEN), Polytetrafluoroethylene (PTFE), or a ceramic such as silica or alumina. Any combination or mixture of the aforementioned materials may be used as well.

In some embodiments, the glow discharge plasma 162 is generated using a pulsed direct current (DC) power supply 176. The second electrode 168 is connected to one end of the pulsed DC power supply 176 and the first electrode 166 is coupled to the other end of the pulsed DC power supply 176 as well as to ground 178.

In some embodiments, the control chamber 164 is supplied with a flow of plasma gas through an inlet 170. Air in the control chamber 164 may be replaced with the plasma gas. In some embodiments, the plasma gas may be an inert gas such as argon. In some other embodiments, the plasma gas may be any other gas, e.g., nitrogen, oxygen, carbon dioxide, Helium, $NH_3$, etc., or any combination or mixture of these gasses.

After establishing the flow of plasma gas through the inlet 170, the first and second electrodes 166, 168 are energized using the pulsed DC power supply 176. Upon reaching a break down voltage, which may be dependent on, amongst others, the plasma gas used and the properties of the first and second dielectrics 172, 174, the glow discharge plasma 162 may be generated between the second dielectric 174 and the basecoat layer 150 of the substrate 102. This may heat the basecoat layer 150 disposed on the surface 104 of the substrate 102.

In some embodiments, voltage may not be applied to the first and second electrodes 166, 168 to initiate generation of the glow discharge plasma 162 until a pressure inside the control chamber 164 is sufficiently low such that a gas molecule density inside the control chamber 164 may be low enough to maintain the glow discharge plasma 162 essentially in an "abnormal glow" state within the control chamber 164. As is known to those skilled in the art, "abnormal glow" occurs when essentially all gas molecules inside the control chamber 164 may be ionized to act as carriers for current. Typically, the pressure inside the control chamber 164 may be maintained between 100 millitorrs (mTorr) and 1,500 mTorr when establishing the "abnormal glow" state of the glow discharge plasma 162, by controlling flow of the plasma gas into the control chamber 164.

In some embodiments, the apparatus 160 may further include one or more mass flow controllers (not shown) which may be operated individually or in combination to provide a wide range of operating pressures within the control chamber 164. A pressure gauge (not shown) may also be provided to continuously monitor and control pressure inside the control chamber 164.

In some embodiments, the glow discharge plasma 162 may be maintained using a DC, pulsed DC, or radio frequency (RF) power supplies. The pulsed DC power supply 176 is preferred, providing more control over the "abnormal glow" state of the glow discharge plasma 162, while allowing simplification of the electrode system since it may not be necessary to impedance match the substrate electrode (i.e., the first electrode 166) as would be required when using RF power supply. Thus, the glow discharge plasma 162 generated using the pulsed DC power supply 176 may be more stable, thereby mitigating plasma breakdown and arcing.

In some embodiments, a frequency of the pulsed DC power supply 176 may be varied up to 350 kilohertz (kHz), with a preferred range of about 150-350 kHz. At frequencies above this range, the apparatus 160 may become unstable and the glow discharge plasma 162 may start to arc. Surface temperatures in excess of 700 degrees Celsius may be achieved to heat the basecoat layer 150 using the pulsed DC power supply 176.

Figure 11:
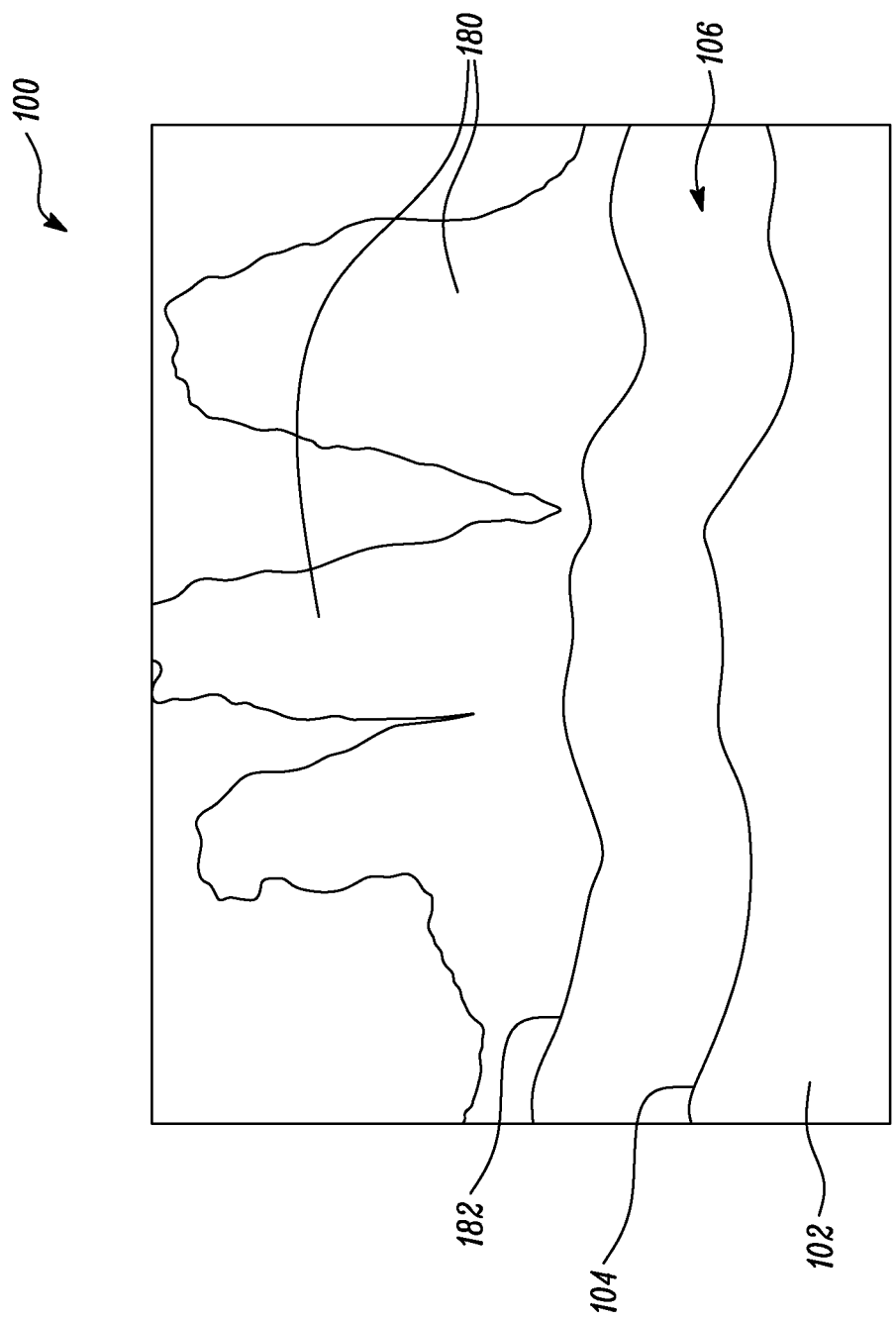
FIG. 11 is a schematic detailed sectional view of the coated article of FIG. 2, according to another embodiment of the present disclosure.

FIG. 11 illustrates a schematic detailed sectional view of the coated article 100. In some embodiments, the protective coating 106 (e.g., nickel aluminide) may be a multi-phase coating, formed by dissolution of the alloying elements, rather than diffusion, as a result of the exothermic reaction. This may be evident from a planar melt front of the protective coating 106 forming a demarcation with the substrate 102. In some embodiments, the protective coating 106 is formed in layers as the exothermic reaction proceeds.

Referring now to FIGS. 10 and 11, in some embodiments, at a first point of contact of the aluminium phase 142 dispersed in the basecoat layer 150 with the substrate 102, energy from the glow discharge plasma 162 may trigger a local, very energetic exothermic reaction giving rise to a plurality of projections 180 (i.e., peak asperities) formed during the exothermic reaction. In some embodiments, the plurality of projections 180 extend from a major surface 182 of the protective coating 106.

In some embodiments, chemical energy released from the exothermic reaction may lead to local melting of the alloying elements present in the aluminium phase 142 of the basecoat layer 150, lateral wetting of the surface 104 of the substrate 102, and release of further energy by the exothermic reaction, propagating formation of the protective coating 106. When all the aluminium and other alloying elements blended in the basecoat layer 150 are consumed, then the exothermic reaction stops. In some embodiments, the plurality of projections 180 may include nickel aluminide as well as other alloying elements present in the aluminium phase 142.

Referring now to FIGS. 4 and 11, in some embodiments, the method 200 further includes removing the plurality of projections 180 extending from the major surface 182 of the protective coating 106. In some embodiments, the plurality of projections 180 may be brittle, may crack, and may be removed as part of subsequent component manufacture (e.g., machining, surface cleaning, etc). After further processing, a dense, multi-phase, aluminium-rich protective coating 106 is obtained that may resist oxidation and hot corrosion at temperatures up to 800 degrees Celsius. The protective coating 106 may also function at higher temperatures, provided a material of the substrate 102 is designed to operate at such increased temperatures.

In some embodiments, the method 200 further includes eliminating the binder phase 148 (shown in FIGS. 7-9) from the protective coating 106. The presence of certain elements (e.g., phosphorous) in the chemical composition of the binder phase 148 may lead to formation of low melting point eutectics, e.g., with sodium sulphate ($Na_2SO_4$) typically present in environment. Thus, it is desirable to remove the binder phase 148 from the final protective coating 106. In some embodiments, the binder phase 148 (shown in FIGS. 7-9) may be removed through surface finishing techniques.

Figure 12:
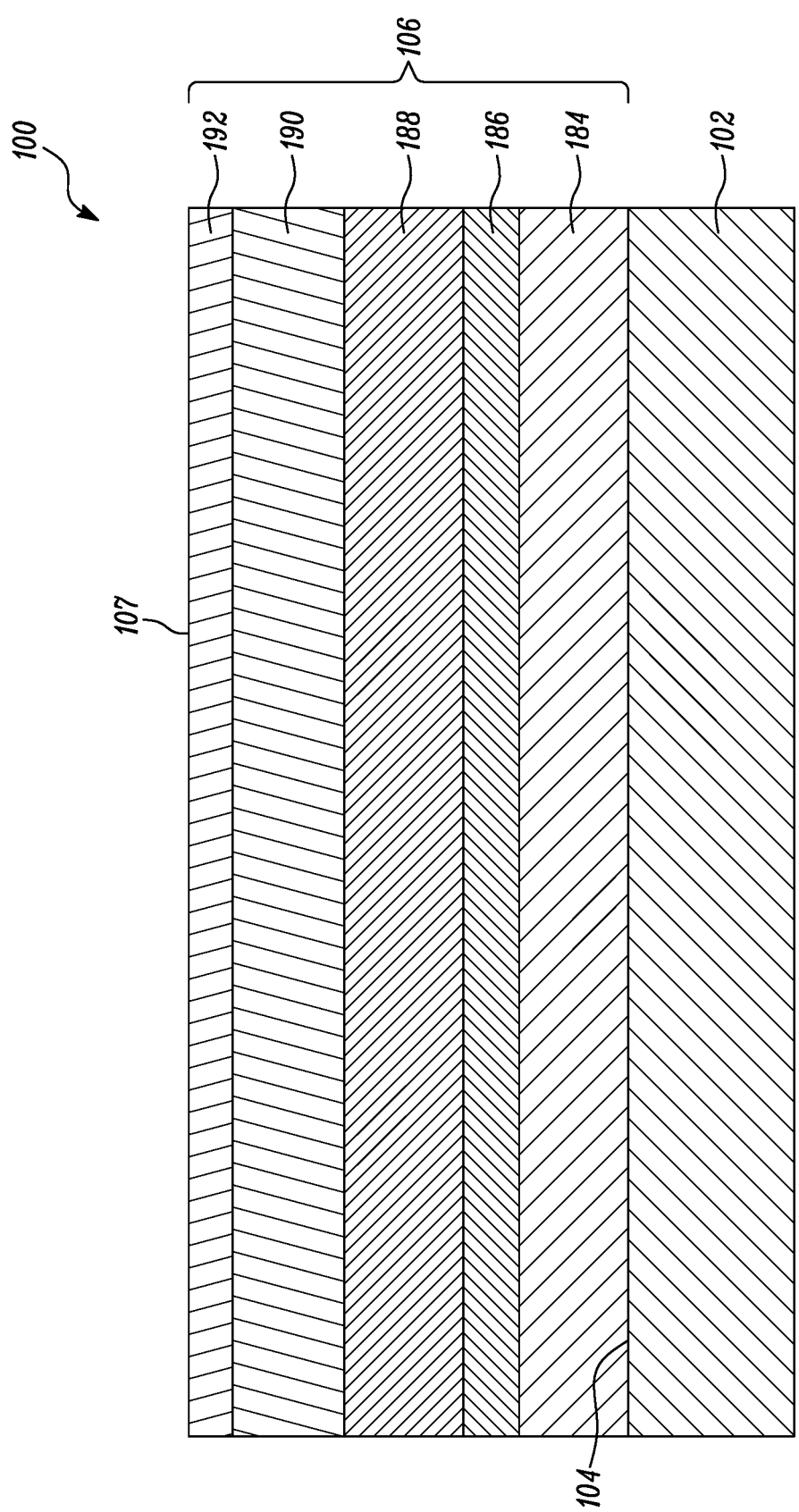
FIG. 12 is a schematic sectional view of the coated article of FIG. 2, according to yet another embodiment of the present disclosure.

FIG. 12 illustrates a schematic sectional view of the coated article 100. In the illustrated embodiment of FIG. 15, the thermally activated, intermetallic protective coating 106 segregates into five different elemental rich zones during formation of the protective coating 106, as a result of progression of the exothermic reaction front between the aluminium phase 142 (shown in FIG. 10) and the substrate 102 (e.g., a nickel-based superalloy, such as Inconel®). Aluminium content of the protective coating 106 decreases from an outer surface 107 of the protective coating 106 to the surface 104 of the substrate 102.

In some embodiments, the protective coating 106 includes a layer 184 disposed adjacent to the substrate 102. The layer 184 may be regarded as a first layer of the protective coating 106 next to the surface 104 of the substrate 102. In some embodiments, the layer 184 may include an aluminium rich nickel aluminide, but with chromium, cobalt and titanium, along with other elements of the substrate 102 all present but in small quantities.

In some embodiments, the protective coating 106 further includes a layer 186 disposed adjacent to the layer 184 and away from the surface 104 of the substrate 102. The layer 186 may be regarded as a second layer of the protective coating 106. In some embodiments, the layer 186 may be a narrow band that is enriched with cobalt, aluminium, and titanium, but depleted in nickel and chromium.

In some embodiments, the protective coating 106 further includes a layer 188 disposed adjacent to the layer 186 and away from the surface 104 of the substrate 102. The layer 188 may be regarded as a third layer of the protective coating 106. In some embodiments, the layer 188 may be a zone similar to the layer 184 but containing a lower chromium content.

In some embodiments, the protective coating 106 further includes a layer 190 disposed adjacent to the layer 188 and away from the surface 104 of the substrate 102. The layer 190 may be regarded as a fourth layer of the protective coating 106. In some embodiments, the layer 190 may be a narrow band that is enriched in aluminium, chromium, molybdenum, and titanium, but depleted in nickel.

In some embodiments, the protective coating 106 further includes a layer 192 disposed adjacent to the layer 190 and away from the surface 104 of the substrate 102. The layer 192 may be regarded as a fifth layer of the protective coating 106. In some embodiments, the layer 192 may be similar to the layer 184, but further enriched in aluminium, with a lower cobalt content. The layer 192 may include asperity peaks associated with early exothermic reaction between the aluminium phase 142 (shown in FIG. 10) and the substrate 102. The layer 192 may include the outer surface 107 of the protective coating 106.

In some embodiments, the narrow bands enriched with chromium, molybdenum, and titanium may be caused by separation of low solubility alloying elements from the intermetallic phase of the protective coating 106 during cooling.

In some embodiments, the protective coating 106 includes, in weight percent, at least 70.35% of aluminium, at least 16.11% of nickel, at least 5.68% of cobalt, at least 5.22% of chromium, at least 1.36% of titanium, at least 0.94% of molybdenum, at least 0.2% of tantalum, at least 0.05% of hafnium, at least 0.05% of boron, at least 0.03% carbon, and at least 0.01% of zirconium.

In some embodiments, a final composition the protective coating 106 may depend upon a composition of the substrate 102 and the alloying elements added to the aluminium phase 142 as the protective coating 106 is formed by dissolution of the surface 104 of the substrate 102 into a heat activated melt zone.

Referring now to FIGS. 2-10, the disclosed method 200 restricts the process of forming the protective coating 106 to the second temperature T2 ensuring that optimum mechanical properties of the substrate 102 are preserved during formation of the protective coating 106. Further, the aluminium phase 142 of the basecoat composition 140 may interdiffuse with the substrate 102 when the basecoat layer 150 is heated to the second temperature T2, thereby forming the protective coating 106 on the substrate 102.

The method 200 is based on developing the basecoat composition 140 (e.g., a slurry) which may be sprayed, painted or otherwise applied, cheaply and efficiently on the surface 104 of the substrate 102. Further, the basecoat composition 140 may support reactive elements (i.e., the aluminium phase 142) during application of the basecoat composition 140 on the surface 104 of the substrate 102, whilst providing environmental protection to the reactive elements during part handling and subsequent heat treatment. Specifically, heating the basecoat layer 150 to the first temperature T1 may cure the basecoat layer 150, thereby providing environmental protection to the aluminium phase 142 of the basecoat composition 140. Additionally, the proposed method 200 is robust, but simple, and may be easily implemented in factory environments.

EXAMPLES

The following examples are offered for illustrative purposes only and are not intended to limit the scope of the disclosure in any way. Indeed, various modifications of the disclosure in addition to those shown and described herein will become apparent to those skilled in the art from the foregoing description and the following examples and fall within the scope of the appended claims.

For forming a protective coating on a surface of a substrate (a nickel-based superalloy, IN625), a basecoat composition was first prepared. The basecoat composition did not form part of the final protective coating. The basecoat composition was capable of carrying and protecting active ingredients while the binder composition along with the active ingredients were processed by a plasma treatment.

For forming the basecoat composition, a required mass of phosphoric acid was diluted to form a solution. Aluminium hydroxide was then added to this solution to obtain an aluminium phosphate binder solution where a ratio of a weight of phosphoric acid to a weight of aluminium hydroxide is 3:1. Aluminium, and other desired alloying elements were added to this solution as aluminium eutectics in a concentration of 2.5 grams (g) of aluminium/aluminium alloy (325 mesh) added to 5 g of the aluminium phosphate binder solution dissolved in water (1 part aluminium phosphate binder to 15 parts of de-ionised water, by weight). The solution was then stirred at about 150 degrees Celsius for about 30 minutes. The final slurry was obtained as the basecoat composition.

A diluted basecoat composition was then pipetted onto the surface of the substrate to obtain a basecoat layer. The basecoat layer was then dried in air at about 250 degrees Celsius for about 12 hours. Following the drying step, the basecoat layer comprised of hydrated aluminium hydrogen phosphates and aluminium, along with various alloying elements.

The basecoat layer was then heated to temperatures up to 800 degrees Celsius for about 4 hours, which converted hydrated aluminium hydrogen phosphates to aluminium phosphate, by losing water vapour. Heat treatment triggered an exothermic reaction between aluminium (along with other alloying elements) and the substrate that produced a thick nickel-aluminide based complex alloy coating.

Heating treatment was performed through application of glow discharge plasma on the basecoat layer in argon gas atmosphere for about 4 hours. The glow discharge plasma was triggered using a pulsed DC power supply, output 5 kilowatts (kW), at a pulsed DC voltage from about 200 volts (V) to about 650 V, and a maximum frequency of 350 kHz, with a 15 milliseconds (ms) on-time. For this system configuration, the optimum frequency was 250 kHz with a 15 ms on-time. The final protective coating was produced at 650 V, a current density of 9.25 milliamperes per square centimetre (mA/cm$^2$), and a power density of 6 W/cm$^2$. For the aforementioned conditions, surface temperature measured was about 710 degrees Celsius. Further, the aforementioned parameters consistently produced a thin coating with a thickness of about 30-50 μm.

Figure 13:
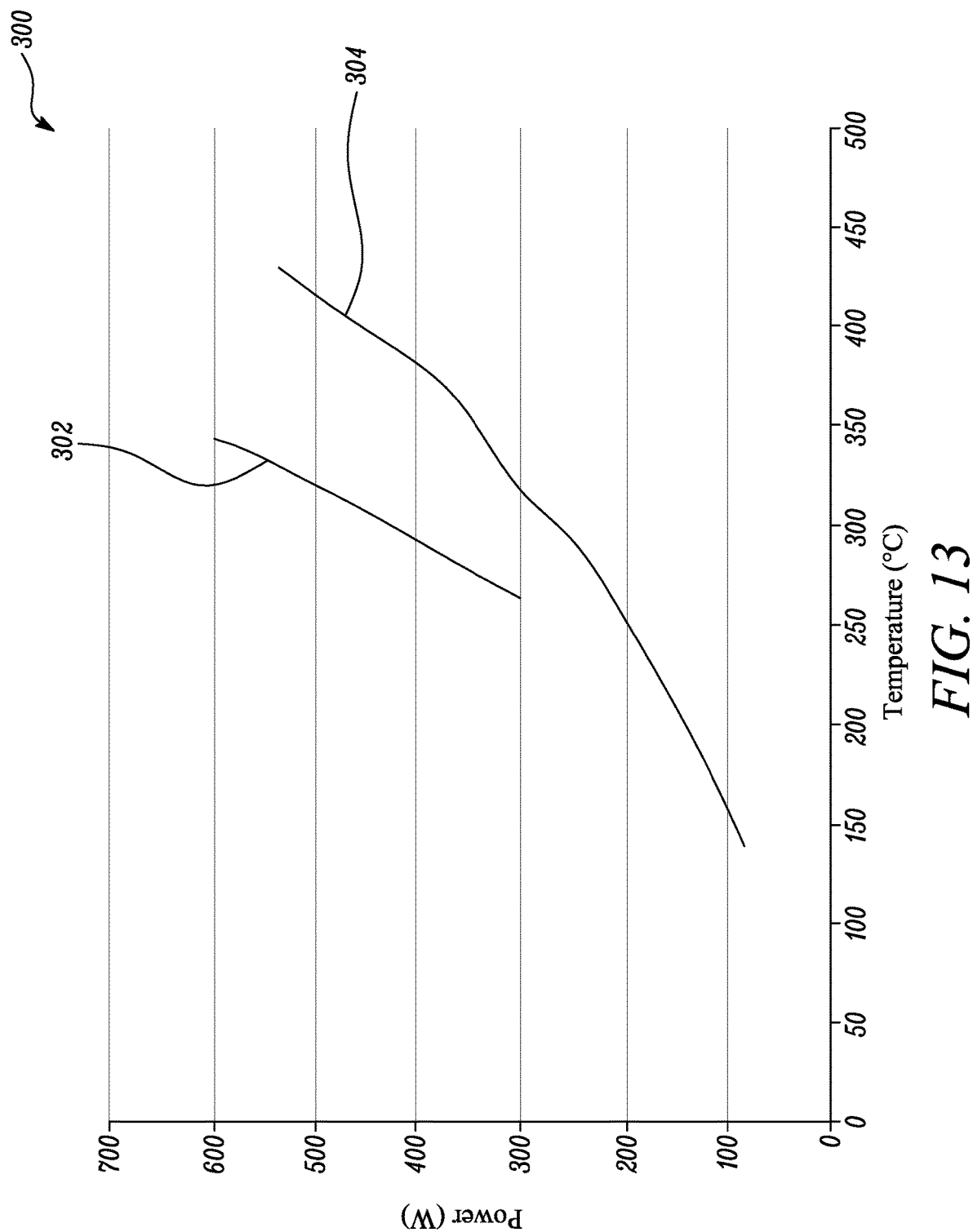
FIG. 13 is an exemplary graph illustrating curves of power versus substrate temperature for air and argon gas, respectively.

FIG. 13 illustrates an exemplary graph 300 showing curves 302, 304 of power versus substrate temperature for air and argon gas, respectively. Experimentally, it was observed that air as the plasma gas may not allow the required power density/current density to activate the exothermic reaction. In other words, temperatures greater than 320 degrees Celsius were not reached with air as the plasma gas before plasma breakdown. Air was prone to breaking down when high voltages were applied, and therefore, the preferred plasma gas was argon, although any other heavy inert gas may also be utilized. Surface temperatures in excess of 700 degrees Celsius were achieved to heat the basecoat layer using the pulsed DC power supply.

Figure 14:
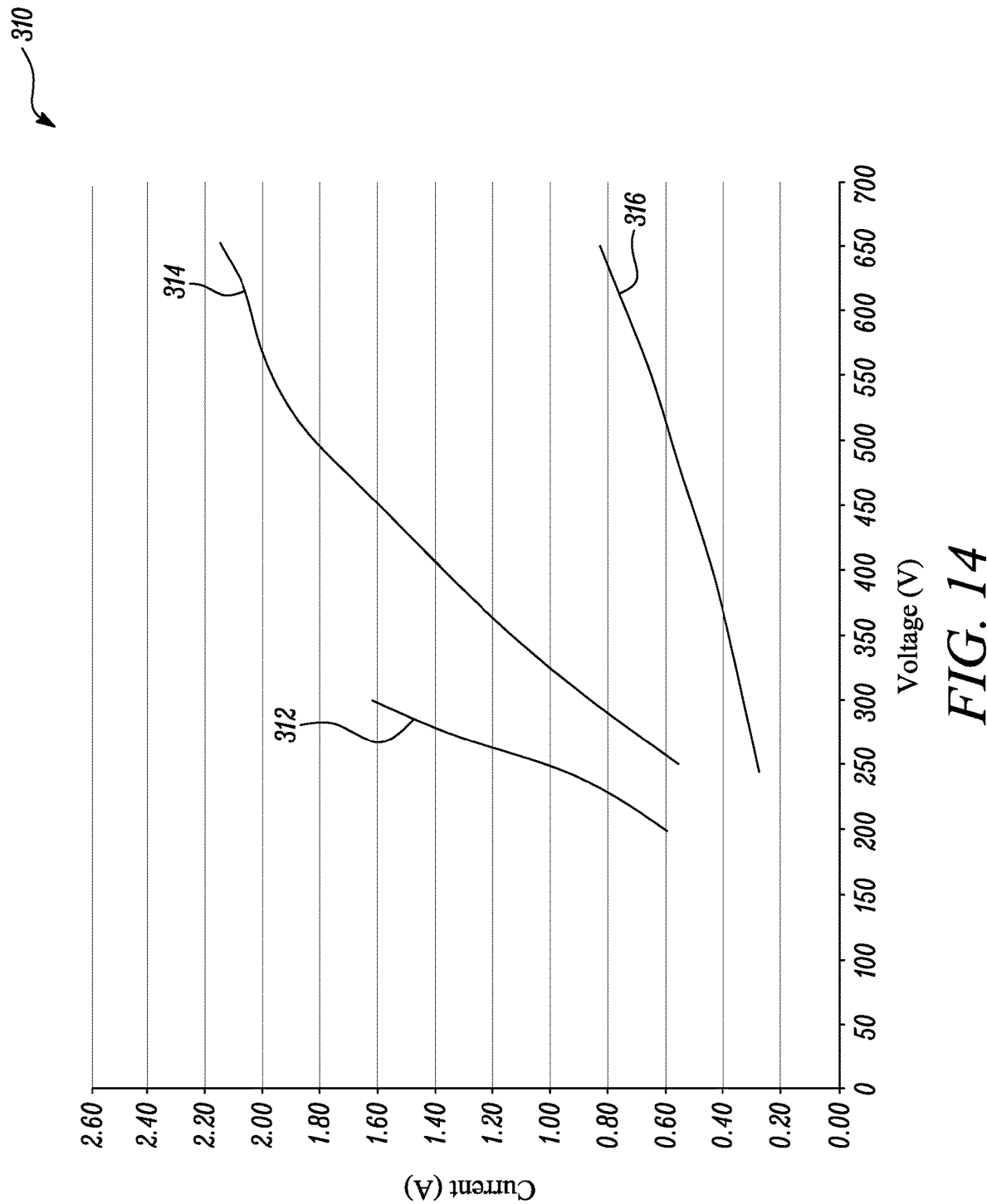
FIG. 14 is an exemplary graph illustrating curves of ion current versus plasma voltage corresponding to three different chamber pressure conditions of a glow discharge plasma apparatus.

FIG. 14 illustrates an exemplary graph 310 showing curves 312, 314, 316 of ion current versus plasma voltage corresponding to three different chamber pressure conditions 187 mTorr/10 standard cubic centimetres per minute (sccm), 860 mTorr/198 sccm, and 1271 mTorr/300 sccm, respectively, of a glow discharge plasma apparatus. Available operating power density was dependent on the induced plasma voltage and ion current density that results. Controlling chamber pressure was critical to obtaining a stable operating condition, and thus, the power density, which in turn may control the induced surface temperature at the basecoat layer.

The chamber pressure range was maintained between 100 mTorr and 1500 mTorr to adjust the power density of glow discharge plasma, the ion current density, and the plasma voltage. The preferred operating pressure was 225 mTorr and 198 sccm. This operating point may be obtained with the plasma voltage of 350 V and the ion current density of 8.5 mA/cm$^2$, thereby achieving the power density of 3 W/cm$^2$. Such conditions were sufficient to develop the glow discharge plasma that was stable and supplied enough energy (i.e., current density) to enable or activate the exothermic reaction.

Figure 15:
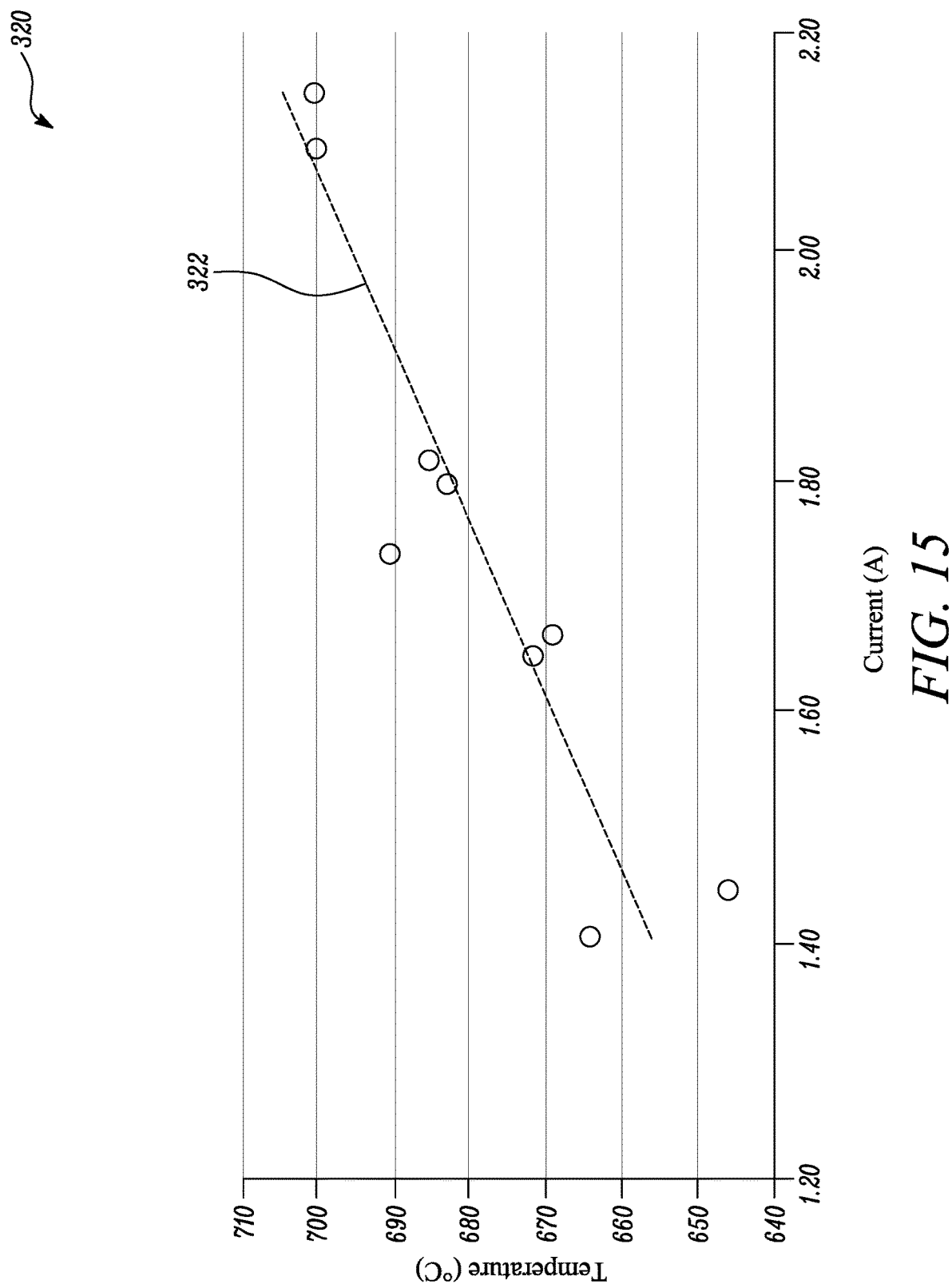
FIG. 15 is an exemplary graph illustrating a curve of surface temperature versus ion current.

FIG. 15 illustrates an exemplary graph 320 showing a curve 322 of surface temperature versus ion current. Plotting the ion current against the surface temperature, under a given set of operating conditions, provided a linear relationship, which allowed the ion current density to be calibrated against the surface temperature. This was dependent on a component surface area, the chamber pressure, and the plasma voltage induced. These plasma conditions were modelled, and the graph 320 demonstrates that the surface temperatures above 700 degrees Celsius were achieved for certain ion current values, whilst a bulk of the substrate remained unaffected from heat due to a heat capacity of the substrate restricting a rate of rise of the temperature of the substrate.

Since coating formation proceeds due to the exothermic reaction, activated by heating of the basecoat layer using the glow discharge plasma induced surface energy, much shorter process times were feasible. It was important that the input energy density should be sufficient to trigger the exothermic reaction, which at a power density of 3 W/cm$^2$ required about 150 s for the basecoat layer to reach about 700 degrees Celsius.

The preferred parameters were current density of about 8.5 mA/cm$^2$, nominal pressure of about 225 mTorr, voltage of about 350 V, and pulse DC frequency of about 250 kHz with 1.6 µs on-time.

Although the present disclosure refers to a turbine disc and a blade of a gas turbine engine, the present disclosure is equally applicable to a turbine shroud, an abradable seal, a combustion chamber wall, or a combustion chamber tile.

Although the present disclosure has been described with reference to a metallic, superalloy, article for a gas turbine engine, the present disclosure is equally applicable to a metallic, superalloy, article for aero gas turbine engines, marine gas turbine engines, automotive gas turbine engines, or industrial gas turbine engines. The present disclosure is equally applicable to metallic, superalloy, articles for other turbomachines, e.g., steam turbines or other apparatus requiring metallic, superalloy, articles with thermal barrier coatings.

It will be understood that the present disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of forming a protective coating, the method comprising:
   providing a substrate comprising at least one chemical element and a surface;
   forming a basecoat composition comprising an aluminium phase comprising aluminium;
      wherein the basecoat layer comprises a binder phase comprising at least one of a phosphate salt and a chromate salt, and wherein the aluminium phase is dispersed in the binder phase;
   applying the basecoat composition on the surface of the substrate to form a basecoat layer;
   heating the basecoat layer to a first temperature (T1) for a predetermined period of time;
   applying a glow discharge plasma on the basecoat layer;
   heating the basecoat layer to a second temperature (T2) greater than the first temperature (T1), in order to activate an exothermic reaction between at least the aluminium phase of the basecoat layer and the at least one chemical element of the substrate, wherein the exothermic reaction forms the protective coating on the surface of the substrate; and
   eliminating the binder phase from the protective coating.

2. The method of claim 1, wherein the at least one chemical element is nickel.

3. The method of claim 2, wherein the exothermic reaction between at least the aluminium phase of the basecoat layer and nickel produces nickel aluminide.

4. The method of claim 1, further comprising removing a plurality of projections extending from a major surface of the protective coating, wherein the plurality of projections is formed during the exothermic reaction.

5. The method of claim 1, wherein the basecoat composition comprises, in weight percent, at least 50% aluminium.

6. The method of claim 1, wherein forming the basecoat composition further comprises:
   forming a solution comprising phosphoric acid;
   adding aluminium hydroxide to the solution;
   adding the aluminium phase to the solution; and
   stirring the solution to obtain the basecoat composition comprising aluminium hydrogen phosphate and the aluminium phase.

7. The method of claim 6, further comprising treating the aluminium phase with a halide-based wash coat solution prior to adding the aluminium phase to the solution.

8. The method of claim 7, wherein the halide-based wash coat solution comprises at least one of nickel chloride, ammonium chloride, and cobalt chloride.

9. The method of claim 6, wherein a ratio of a weight of phosphoric acid to a weight of aluminium hydroxide is 3:1.

10. The method of claim 1, wherein the aluminium phase of the basecoat composition comprises at least one of pure aluminium, an aluminium-chromium alloy, an aluminium-niobium alloy, an aluminium-tantalum-alloy, an aluminium-manganese alloy, an aluminium-silicon alloy, an intermetallic aluminium alloy, and an aluminium alloy comprising at least 50% aluminium.

11. The method of claim 1, wherein the basecoat composition further comprises at least one of niobium, tantalum, chromium and manganese.

12. The method of claim 1, wherein the basecoat composition further comprises at least one of yttrium, zirconium, hafnium and silicon.

13. The method of claim 1, wherein the glow discharge plasma is generated using a pulsed direct current (DC) power supply.

14. The method of claim 1, wherein the first temperature (T1) is 250 degrees Celsius.

15. The method of claim 1, wherein the second temperature (T2) is less than or equal to 900 degrees Celsius.

16. The method of claim 15, wherein the second temperature (T2) is less than or equal to 800 degrees Celsius.

17. The method of claim 15, wherein the second temperature (T2) is from 750 degrees Celsius to 850 degrees Celsius.

18. A method of forming a protective coating, the method comprising:
   providing a substrate comprising at least one chemical element and a surface;
   forming a basecoat composition comprising an aluminium phase comprising aluminium, wherein forming the basecoat further comprises
      forming a solution comprising phosphoric acid;
      adding aluminium hydroxide to the solution;
      adding the aluminium phase to the solution; and
      stirring the solution to obtain the basecoat composition comprising aluminium hydrogen phosphate and the aluminium phase;
   applying the basecoat composition on the surface of the substrate to form a basecoat layer;
   heating the basecoat layer to a first temperature (T1) for a predetermined period of time;
   applying a glow discharge plasma on the basecoat layer;
   heating the basecoat layer to a second temperature (T2) greater than the first temperature (T1), in order to activate an exothermic reaction between at least the aluminium phase of the basecoat layer and the at least one chemical element of the substrate, wherein the exothermic reaction forms the protective coating on the surface of the substrate; and removing a plurality of projections extending from a major surface of the protective coating, wherein the plurality of projections is formed during the exothermic reaction.

19. A method of forming a protective coating, the method comprising:
provides a substrate comprising at least one chemical element and a surface;
forming a basecoat composition comprising an aluminium phase comprising aluminium;
applying the basecoat composition on the surface of the substrate to form a basecoat layer;
heating the basecoat layer to a first temperature (T1) for a predetermined period of time;
applying a glow discharge plasma on the basecoat layer;
heating the basecoat layer to a second temperature (T2) greater than the first temperature (T1), in order to activate an exothermic reaction between at least the aluminium phase of the basecoat layer and the at least one chemical element of the substrate, wherein the exothermic reaction forms the protective coating on the surface of the substrate; and
treating the aluminium phase with a halide-based wash coat solution prior to adding the aluminium phase to the solution.

20. The method of claim 19, wherein the halide-based wash coat solution comprises at least one of nickel chloride, ammonium chloride, and cobalt chloride.

* * * * *